(12) United States Patent
Sendo (10) Patent No.: US 7,872,789 B2
(45) Date of Patent: Jan. 18, 2011

(54) OPTICAL DEVICE, OPTICAL SCANNER, AND IMAGE FORMING APPARATUS

(75) Inventor: Masahiko Sendo, Suwa (JP)

(73) Assignee: Seiko Epson Corporation, Tokyo (JP)

(*) Notice: Subject to any disclaimer, the term of this patent is extended or adjusted under 35 U.S.C. 154(b) by 277 days.

(21) Appl. No.: 11/777,792

(22) Filed: Jul. 13, 2007

(65) Prior Publication Data

US 2009/0174921 A1 Jul. 9, 2009

(30) Foreign Application Priority Data

Aug. 9, 2006 (JP) ............................. 2006-217480

(51) Int. Cl.
*G02B 26/00* (2006.01)

(52) U.S. Cl. ............... 359/199.3; 359/200.7; 359/225.1

(58) Field of Classification Search ... 359/196.1–226.3, 359/838–884, 237–349
See application file for complete search history.

(56) References Cited

U.S. PATENT DOCUMENTS

| 3,642,344 | A | 2/1972 | Corker |
| 7,095,549 | B2* | 8/2006 | Iwasaki et al. ............... 359/298 |
| 2005/0116551 | A1* | 6/2005 | Yoda ............................. 310/36 |
| 2005/0146765 | A1* | 7/2005 | Turner et al. ................. 359/224 |
| 2006/0017333 | A1 | 1/2006 | Loebel et al. |

FOREIGN PATENT DOCUMENTS

| JP | 63-158579 | 7/1988 |
| JP | 01-195417 | 8/1989 |
| JP | 09-054264 | 2/1997 |
| JP | 09-138366 | 5/1997 |
| JP | 2000-235152 | 8/2000 |
| JP | 2004-229922 | 8/2004 |
| JP | 2004-255174 | 9/2004 |
| JP | 2005-052502 | 3/2005 |
| JP | 2005-084571 | 3/2005 |
| JP | 2006-087521 | 4/2006 |

* cited by examiner

*Primary Examiner*—Stephone B Allen
*Assistant Examiner*—Jennifer L. Doak
(74) *Attorney, Agent, or Firm*—Workman Nydegger (57) ABSTRACT

An optical device includes a mass section in a plate shape including a light reflector with light reflectivity, a supporting section for supporting the mass section, a pair of elastic sections with elastic deformability for coupling the mass section to the supporting section in a pivotally movable manner, and a driving unit for pivotally moving the mass section, the driving unit including a magnetic section provided to the mass section, magnetized in a direction perpendicular to a surface of the mass section, a pair of magnetic poles with different polarities, provided in a manner to face each other in a direction perpendicular to a pivotal movement central axis with the magnetic portion intervened on the basis of a top view of the mass section in a non-driven condition, and a magnetic field generator having a coil for generating a magnetic force between the pair of magnetic poles. The mass section is pivotally moved upon torsional deformation of the elastic section by operating the driving unit so that a direction of light reflected by the light reflector is changeable. The magnetic generator is structured in a manner to generate a magnetic field between the pair of magnetic poles by applying a voltage to the coil to pivotally move the mass section with respect to the supporting section.

6 Claims, 6 Drawing Sheets

OPTICAL DEVICE, OPTICAL SCANNER, AND IMAGE FORMING APPARATUS

BACKGROUND OF THE INVENTION

1. Technical Field

The present invention relates to an optical device, an optical scanner, and an image forming apparatus.

As an optical device used for a laser printer or the like, which draws by light scanning, such a device has been known that adopts a torsional resonator with the purpose of miniaturization. JA-A-9-138366 is an example of related art.

An optical device according to JA-A-9-138366, for example, includes a small mirror-finished magnet as a mirror section, a supporting section for supporting the small magnet, a torsion spring for coupling the small magnet to the supporting section in a pivotally movable manner, and a coil provided in a manner to face a surface of the small magnet. An alternating current is passed through the coil to generate an alternating magnetic field so that light scanning is executed by resonating the small magnet.

With equal magnetic force that is caused by passing the current through the coil, the magnetic force exerted on the small magnet becomes stronger as a distance between the small magnet and the coil is smaller. In other words, a smaller distance between the small magnet and the coil enables a lower-voltage driving to cut down power consumption. The optical device according to JA-A-9-138366, however, is provided with the coil and the small magnet in a manner that the coil faces the surface of the small magnet. Therefore, it is required to place the coil and the small magnet separately from each other to the extent that the small magnet is pivotally movable, in other words, that the small magnet and the coil are prevented from coming into contact. As a result, such a problem arises that electric power saving becomes difficult.

Furthermore, separate placement of the coil and the small magnet to the extent allowing pivotal movement of the small magnet leads to increased size of the optical device. This problem becomes more serious as an angle of pivotal movement of the small magnet is made larger. In other words, there also arises such a problem that it is difficult to enlarge the angle of pivotal movement of the small magnet while achieving miniaturization of the optical device.

As described above, the optical device according to JA-A-9-138366 has a problem that it is difficult to achieve electric power saving and miniaturization while enlarging the angle of pivotal movement of the small magnet.

SUMMARY

An advantage of the present invention is to provide an optical device, an optical scanner, and an image forming apparatus that achieve electric power saving and miniaturization while having a large angle of pivotal movement.

An optical device according to one aspect of the invention includes a mass section in a plate shape including a light reflector with light reflectivity, a supporting section for supporting the mass section, a pair of elastic sections with elastic deformability for coupling the mass section to the supporting section in a pivotally movable manner, and a driving unit for pivotally moving the mass section. The driving unit includes a magnetic section provided to the mass section, magnetized in a direction perpendicular to a surface of the mass section, a pair of magnetic poles with different polarities, provided in a manner to face each other in a direction perpendicular to a pivotal movement central axis with the magnetic portion intervened on the basis of a top view of the mass section in a non-driven condition, and a magnetic field generator having a coil for generating a magnetic force between the pair of magnetic poles. The mass section is pivotally moved upon torsional deformation of the elastic section by operating the driving unit so that a direction of light reflected by the light reflector is changeable. The magnetic generator is structured in a manner to generate a magnetic field between the pair of magnetic poles by applying a voltage to the coil to pivotally move the mass section with respect to the supporting section.

With this structure, the mass section and the pair of magnetic poles can be prevented from interfering with each other, so that the angle of pivotal movement of the mass section can be enlarged while miniaturization of the optical device can be achieved.

In the above-mentioned optical device, it is preferable that the mass section be provided with the light reflector at one surface side while being provided with the magnetic section at the other surface side.

With this structure, a degree of freedom in terms of the layout design or the like of the light reflector and the magnetic section can be increased.

In the above-mentioned optical device, it is preferable that the magnetic section be shaped in a thin film form and be provided along the surface of the mass section.

With this structure, shift of the pivotal movement central axis of the mass section can be prevented, thereby enabling stable pivotal movement of the mass section.

In the above-mentioned optical device, it is preferable that the magnetic field generator include a magnetic core on which the coil is wound, a pair of yokes provided to both end portions of the magnetic core, forming a magnetic path in a manner to compose the pair of magnetic poles, and a voltage applicator for applying a voltage to the coil, in which the voltage applicator applies the voltage to the coil so as to generate the magnetic field between the pair of magnetic poles.

With this structure, the optical device can generate the magnetic field between the pair of magnetic poles with a comparatively simple structure.

In the above-mentioned optical device, it is preferable that the voltage applicator be structured in a manner to apply an alternating voltage to the coil.

With this structure, a direction of the magnetic field between the pair of magnetic poles can be switched, thereby enabling the mass section to be pivotally moved smoothly.

In the above-mentioned optical device, it is preferable that each of the magnetic poles have a length substantially equal to a length of the magnetic section in a direction parallel to the pivotal movement central axis of the mass section.

With this structure, the mass section can be pivotally moved with stability.

In the above-mentioned optical device, it is preferable that a distance between the pair of magnetic poles include a region at a side on which the light is incident, the region which gradually widens in an output direction of the light.

With this structure, such a case can be avoided that path for the light reflected by the light reflector is interfered with.

In the above-mentioned optical device, it is preferable that the mass section include a pair of first mass sections in a plate form, a second mass section provided between the pair of first mass sections on the basis of a top view, and a pair of coupling members with elastic deformability for coupling the second mass section to the first mass sections in a pivotally movable manner, in which the second mass section is provided with the light reflector and each of the first mass sections is provided with the magnetic section.

According to another aspect of the invention, an optical scanner includes a mass section in a plate shape including a light reflector with light reflectivity, a supporting section for supporting the mass section, a pair of elastic sections with elastic deformability for coupling the mass section to the supporting section in a pivotally movable manner, and a driving unit for pivotally moving the mass section. The driving unit includes a magnetic section provided to the mass section, magnetized in a direction perpendicular to a surface of the mass section, a pair of magnetic poles with different polarities, provided in a manner to face each other in a direction perpendicular to a pivotal movement central axis with the magnetic portion intervened on the basis of a top view of the mass section in a non-driven condition, and a magnetic field generator having a coil for generating a magnetic force between the pair of magnetic poles. The mass section is pivotally moved upon torsional deformation of the elastic section by operating the driving unit so that a light reflected by the light reflector is scanned. The magnetic generator is structured in a manner to generate a magnetic field between the pair of magnetic poles by applying a current to the coil to pivotally move the mass section with respect to the supporting section.

With this structure, the mass section and the pair of magnetic poles can be prevented from interfering with each other, thereby being able to provide an optical scanner that is miniaturized and contains a mass section with a large angle of pivotal movement.

According to a further aspect of the invention, an image forming apparatus includes a mass section in a plate shape including a light reflector with light reflectivity, a supporting section for supporting the mass section, a pair of elastic sections with elastic deformability for coupling the mass section to the supporting section in a pivotally movable manner, and a driving unit for pivotally moving the mass section. The driving unit includes a magnetic section provided to the mass section, magnetized in a direction perpendicular to a surface of the mass section, a pair of magnetic poles with different polarities, provided in a manner to face each other in a direction perpendicular to a pivotal movement central axis with the magnetic portion intervened on the basis of a top view of the mass section in a non-driven condition, a magnetic field generator having a coil for generating a magnetic force between the pair of magnetic poles, and an optical scanner for scanning a light reflected by the light reflector by pivotally moving the mass section upon torsional deformation of the elastic section by operating the driving unit. The magnetic generator is structured in a manner to generate a magnetic field between the pair of magnetic poles by applying a current to the coil to pivotally move the mass section with respect to the supporting section.

With this structure, an image forming apparatus with superior light scanning characteristics can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an optical device according to the present invention will be explained with reference to accompanying drawings.

First Embodiment

A first embodiment of an optical device according to this invention will be explained first.

Figure 1:
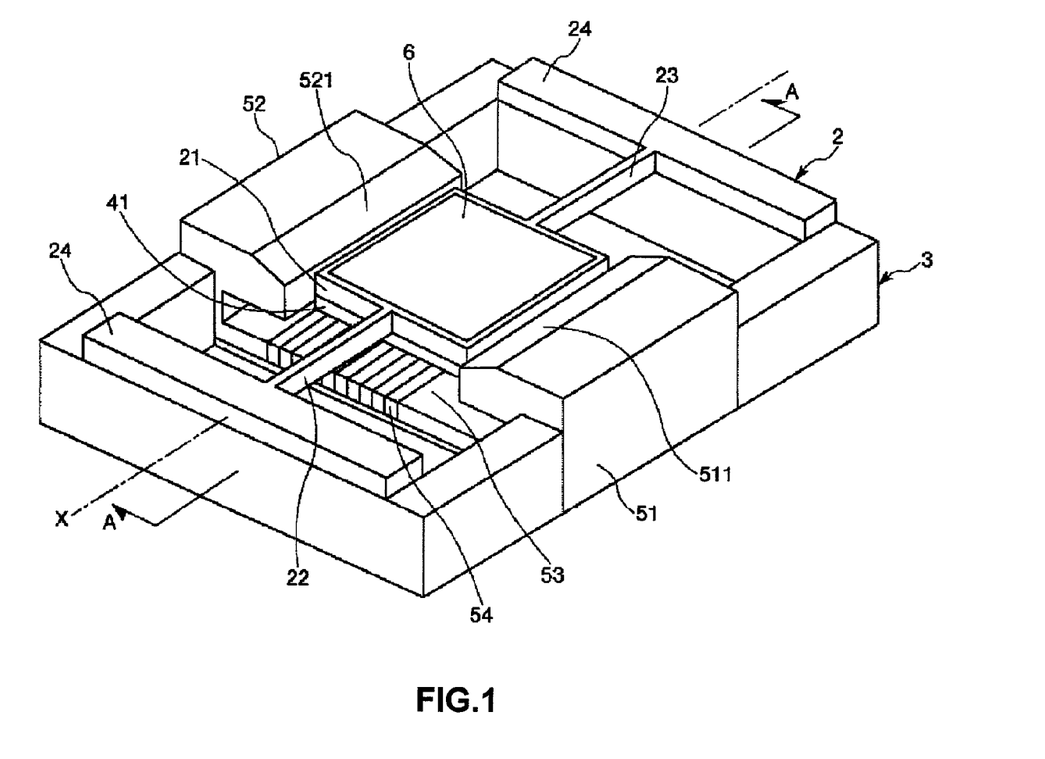
FIG. 1 is a perspective view of an optical device according to a first embodiment of this invention.
Figure 2:
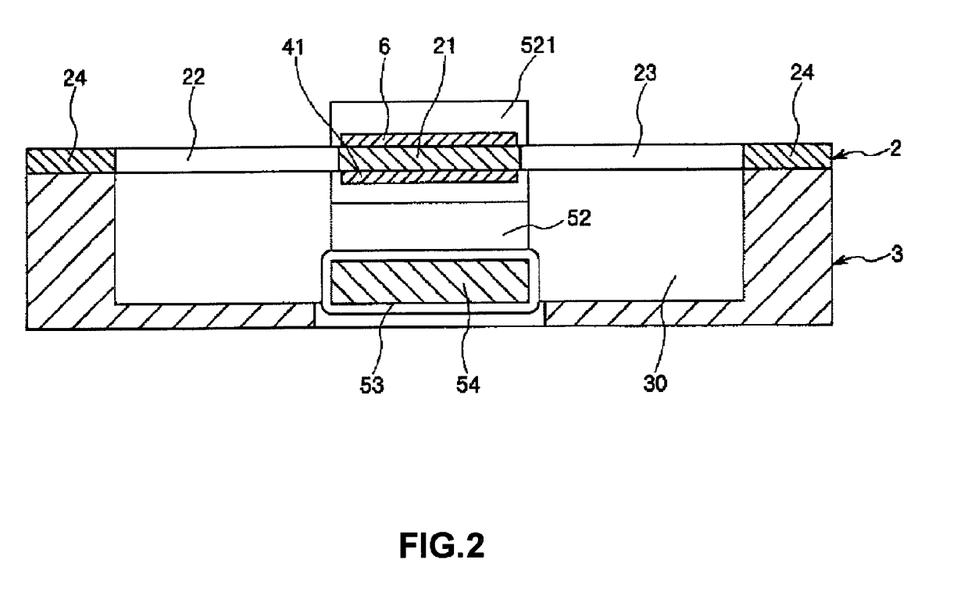
FIG. 2 is a cross-sectional view of FIG. 1 along the line A-A.
Figure 3:
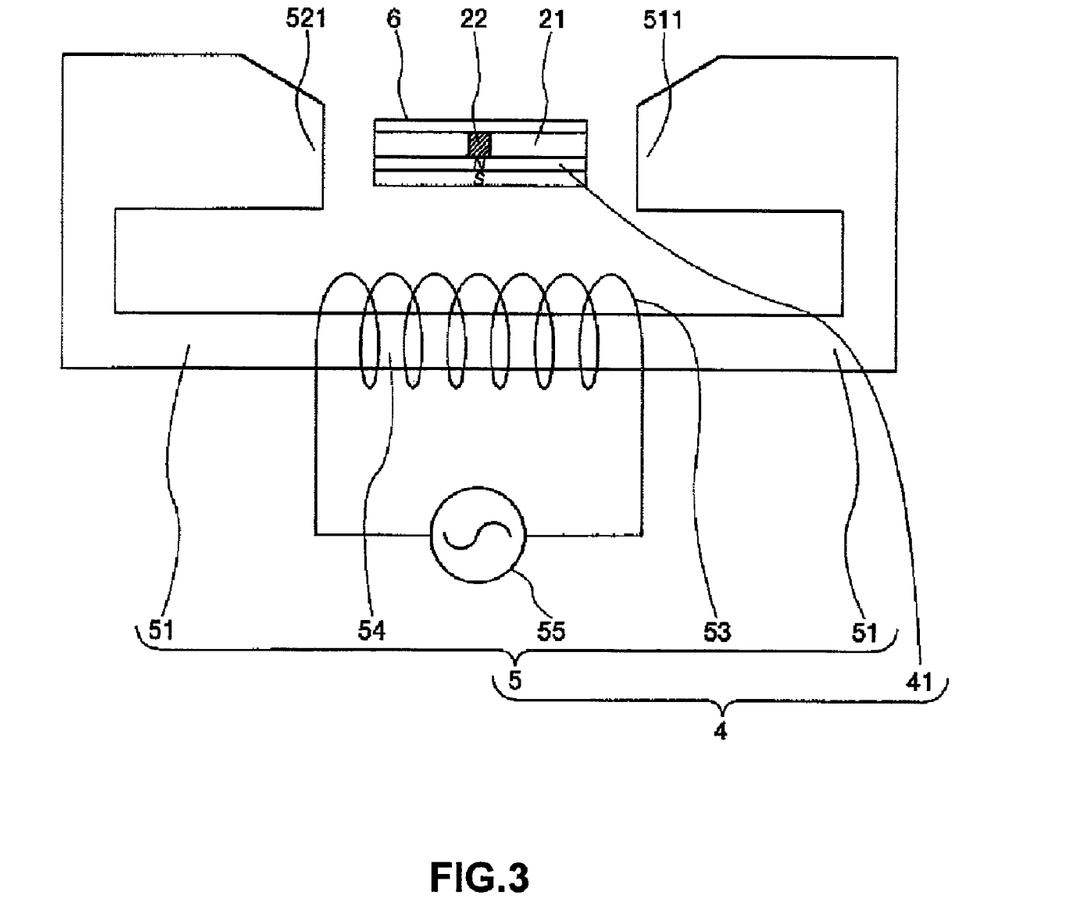
FIG. 3 is a view for illustrating a driving unit.

FIG. 1 is a perspective view of the optical device according to the first embodiment of the invention. FIG. 2 is a cross-sectional view of FIG. 1 along the line A-A. FIG. 3 is a view for illustrating a driving unit.

For convenience of explanation, hereinafter, a frontward side of a sheet of FIG. 1 is referred to as an "upper" or "upward" side; a downward side is referred to as a "lower" or "downward" side; a right side is referred to as a "right" side; and a left side is referred to as a "left" side. An upper side of each of FIGS. 2 and 3 is referred to as an "upper" or "upward" side; a lower side is referred to as a "lower" or "downward" side; a right side is referred to as a "right" side; and a left side is referred to as a "left" side.

An optical device 1 includes a base 2 having a one-degree-of-freedom vibration system and a supporting substrate 3 for supporting the base 2, as shown in FIG. 1.

The base 2 includes a mass section 21 as a movable section, a pair of elastic sections 22, 23, and supporting sections 24.

The optical device 1 described above is structured in a manner that the pair of elastic sections 22, 23 are torsionally deformed by generating the magnetic field between a pair of magnetic poles 511, 521 described later so as to pivotally move the mass section 21. At this point, the pair of elastic sections 22, 23 is pivotally moved centered around a pivotal movement central axis X, which is shown in FIG. 1.

The pair of elastic sections 22, 23 is provided so as to be substantially symmetric with respect to the mass section 21 on the basis of a top view of the mass section 21. That is, the optical device 1 according to this embodiment is formed in a manner to be substantially symmetric with respect to the mass section 21 on the basis of the top view of the mass section 21.

The mass section 21 is shaped in a plate form and provided with a light reflector 6 on an upper surface, i.e., a planar surface at a side opposite to the supporting substrate 3.

Furthermore, the mass section 21 is provided with a magnetic body 41 as a magnetic section on a lower surface, i.e., a planar surface at a side facing the supporting substrate 3. The magnetic body 41 will be explained in detail in explanation about a driving unit 4 to be described later.

The mass section 21 described above is connected to the supporting sections 24 via the elastic sections 22, 23.

The elastic section 22 couples the mass section 21 to one of the supporting sections 24 so that the mass section 21 is pivotally movable with respect to the supporting section 24. In a similar manner, the elastic section 23 couples the mass section 21 to the other supporting section 24 so that the mass section 21 is pivotally movable with respect to the supporting section 24.

The pair of elastic sections 22, 23 described above is provided in a manner to be placed on the same shaft, and the mass section 21 is pivotally movable with respect to the supporting sections 24 with these elastic sections 22, 23 set as the pivotal movement central axis X, serving as a rotational axis.

As described above, the base 2 has a single vibration system composed of the mass section 21 and the pair of elastic sections 22, 23. That is, the base 2 has a one-degree-of-freedom vibration system.

The base 2 described above is made of silicon as a main material and is provided with the mass section 22, the pair of elastic sections 22, 23, and the supporting sections 24 in a united manner. As described above, use of the silicon as a main material enables the optical device 1 to achieve superior pivotal movement characteristics and to exhibit superior durability. Furthermore, the use of the silicone enables fine processing while achieving miniaturization of the optical device 1.

The base 2 may be formed by forming the mass section 21, the pair of elastic sections 22, 23, and the supporting sections 24 from a substrate having a laminated structure, such as an SOI substrate. In this point, it is preferable that the mass section 21, the elastic sections 22, 23, and the supporting sections 24 be composed in a single layer of the laminated-structural substrate so that these sections are partially united.

The base 2 described above is attached in a supported manner to the supporting substrate 3 as shown in FIG. 1.

The supporting substrate 3 is made of a nonmagnetic body such as glass or silicon as a main material.

The supporting substrate 3 is provided with a concave section 30 on an upper surface, as shown in FIG. 2. This concave section 30 functions as a runout section for preventing the mass section 21 from coming in contact with the supporting substrate 3 at the time of pivotal movement.

Next, the driving unit 4 for moving the mass section 21 pivotally will be described in detail.

The driving unit 4 includes the magnetic body 41 as the magnetic section provided to the mass section 21 and a magnetic field generator 5 for generating the magnetic field exerted on the magnetic body 41.

The mass section 21 is provided with the magnetic body 41 on the lower surface, i.e., the surface at a side opposite to the light reflector 6. As a result, a degree of freedom in terms of layout design or the like of the light reflector 6 and the magnetic body 41 can be increased.

Furthermore, the magnetic body 41 is provided to a surface of the mass section 21 so as to be symmetric with respect to the pivotal movement central axis X on the basis of a top view. Thus, shift of the pivotal movement central axis X of the mass section 21 can be prevented even where the mass section 21 is provided with the magnetic body 41. As a result, the optical device 1 enables stable pivotal movement of the mass section 21.

Furthermore, the magnetic body 41 is shaped in a thin film form and is formed along the surface of the mass section 21. Therefore, the mass section 21 can be reduced in total thickness, i.e., a length of a direction perpendicular to the surface, thereby achieving miniaturization of the optical device 1. Yet further, a distance between centers of the mass section 21 and the magnetic body 41 in a direction perpendicular to the surface of the mass section 21 can be shortened, thereby enabling stable pivotal movement of the mass section 21.

The magnetic body 41 described above is magnetized, that is, made magnetic, in a direction perpendicular to the surface of the mass section, i.e., a thickness direction of the mass section 21. In other words, the magnetic body 41 is magnetized in a vertical direction in FIG. 2. To be more specific, in the case of the magnetic body 41 in which a north pole is formed at a side of a surface facing the mass section 21 and a south pole is formed at a side of an opposite surface, magnetization is made in an upward direction in FIG. 2. In the case of the magnetic body 41 in which a north pole is formed at a side of the surface opposite to the surface facing the mass section 21 and a south pole is formed at a side of the surface facing the massive section, magnetization is made in a downward direction in FIG. 2. Hereinafter, for convenience of explanation, the case where the magnetic body 41 is magnetized, i.e., made magnetic in a downward direction will be explained.

The magnetic body 41 is such that a hard magnetic material is magnetized, and is a so-called permanent magnet. This type of the magnetic body 41 is not particularly limited but may be exemplified as a neodymium magnet, a ferrite magnet, a samarium-cobalt magnet, an alnico magnet, and the like.

The magnetic field generator 5 includes a pair of yokes 51, 52 forming a magnetic path, a coil 53 for generating a magnetic field, a magnetic core 54 on which the coil 53 is wound, and an alternating current source 55 as a voltage applicator for applying voltage to the coil 53.

The magnetic core 54 is provided securely to the supporting substrate 3, as shown in FIG. 2. The coil 53 is wound on this magnetic core 54 and is connected to the alternating current source 55 as the voltage applicator.

The magnetic core 54 is made of a soft magnetic material as a main material. This type of the soft magnetic material is not particularly limited but may be exemplified as an Fe, an Fe alloy such as a ferrosilicon, a permalloy, an amorphous, and a sendust, a soft magnetic ferrite, and the like.

The yoke 51 is formed such that one end is connected to the magnetic core 54 and the other end faces a side surface of the mass section 21, which is distal to the pivotal movement central axis X. An end portion of the yoke 51, which is located at a side facing the mass section 21 functions as a magnetic pole 511. In this embodiment, the yoke 51 is in a letter U shape.

In a similar manner, the yoke 52 is formed such that one end is connected to the magnetic core 54 and the other end faces a side surface of the mass section 21, which is distal to the pivotal movement central axis X. An end portion of the yoke 52, which is located at a side facing the mass section 21, functions as a magnetic pole 521. In this embodiment, the yoke 52 is in a letter U shape and is made approximately the same as the yoke 51 in shape and size In other words, the yokes 51, 52 form the magnetic path in a manner to compose the pair of magnetic poles 511, 521.

The magnetic field generator 5 described above is formed such that the magnetic poles 511, 521 are made to exhibit polarities different from each other by applying the voltage from the alternating current source 55 to the coil 53 so as to generate a magnetic field between the pair of magnetic poles 511, 521. As a result, the magnetic generator 5 can generate the magnetic field between the magnetic poles 511, 521 with a comparatively simple structure.

A material of the yokes 51, 52 is not particularly limited as long as a magnetic flux can be induced. A soft magnetic material, for example, can preferably be used.

The pair of magnetic poles 511, 521 is provided so as to berespect face each other with the mass section 21 intervened therebetween in a direction perpendicular to the pivotal movement central axis X on the basis of a top view of the mass section 21 in a non-driven condition. With the structure described above, the pair of magnetic poles 511, 521 can be placed near the mass section 21, thereby achieving miniaturization of the optical device and power saving. With the structure described above, furthermore, the pair of magnetic poles 511, 521 can be prevented from disturbing pivotal movement of the mass section 21, thereby enlarging an angle of pivotal movement. In other words, this structure achieves miniaturization of the optical device and power saving while enlarging the angle of pivotal movement.

The pair of magnetic poles 511, 521 is provided so as to be slightly longer than or be substantially equal to the magnetic body 41 (the mass section 21) in a direction parallel to the pivotal movement central axis X of the mass section 21. Therefore, the magnetic body 41 receives magnetic force uniformly in a direction parallel to the pivotal movement central axis X, thereby enabling the mass section 21 to pivotally move with stability, and further, achieve power saving.

As shown in FIG. 3, the magnetic poles 511, 512 are provided in a manner to face side surfaces of the mass section 21 which are distal to the pivotal movement central axis X. Thus, the magnetic field can be reliably generated between the pair of the magnetic poles 511, 521.

Furthermore, a distance between the magnetic poles 511, 521 includes a region at a side of light incidence that gradually widens in a direction of light output, thereby preventing interference with reflection of incident light.

The driving unit 4 with the structure described above pivotally moves, i.e., drives the mass section 21 in a manner described hereinafter.

The alternating current source 55 applies the voltage to the coil 53 to generate the magnetic force on the magnetic core 54, thereby making one of the magnetic poles 511, 521 have a south pole and the other have a north pole. Thus, the magnetic field is generated between the pair of magnetic poles 511, 521.

On the other hand, the mass section 21 is provided with the magnetic body 41, which is magnetized, i.e., made magnetic in a direction perpendicular to a surface of the mass section 21. Thus, a direction of the magnetic field generated between the pair of magnetic poles 511, 521 is orthogonal to a magnetization direction of the magnetic body 41 on the basis of a top view of the mass section 21 in a non-driven condition.

In such a state where the direction of the magnetic field generated between the pair of magnetic poles 511, 521 is orthogonal to the magnetization direction of the magnetic body 41, the magnetic field 41 (the mass section 21) receives a force, i.e., a torque making the magnetization direction of the magnetic body 41 and the magnetic field generated between the pair of magnetic poles 511, 521 be in the same direction, in other words, be parallel to each other.

To be more specific, in the case where the magnetic pole 511 has a south pole and the magnetic pole 521 has a north pole, which is refereed to as "the first condition", the magnetic field in a right direction in FIG. 3, i.e., a direction from the magnetic pole 521 to the magnetic pole 511, is generated between the pair of magnetic poles 511, 521. The magnetic body 41 (the mass section 21) receives the torque in a clockwise direction, i.e., a right-handed direction in FIG. 3 on the basis of the pivotal movement central axis X being set as an axis. On the other hand, in the case where the magnetic pole 511 has a north pole and the magnetic pole 521 has a south pole, which is referred to as "the second condition", the magnetic field in a left direction in FIG. 3, i.e., a direction from the magnetic pole 511 to the magnetic pole 521, is generated between the pair of magnetic poles 511, 521. The magnetic body 41 receives torque in a counterclockwise direction, i.e., a left-handed direction in FIG. 3 on the basis of the pivotal movement central axis X being set as an axis.

The first and second conditions are repeated by turns so that the elastic sections 22, 23 are torsionally deformed to pivotally move the mass section 21 with respect to the supporting sections 24. Use of the alternating current source 55 as the voltage applicator enables the pair of magnetic poles 511, 521 to periodically switch each other's polarity, so that the mass section 21 can be pivotally moved smoothly.

The driving unit 4 described above achieves miniaturization of the optical device 1 and power saving while enlarging the angle of pivotal movement of the mass section 21.

As described above, the optical device 1 is applied to an optical scanner, an optical switch, or an optical attenuator, for example.

The optical scanner according to this invention includes a mass section, a light reflector, a supporting section, a pair of elastic sections, and a driving unit, in a manner similar to the optical device 1 according to the invention. The optical scanner described above pivotally moves the mass section while deforming the elastic section torsionally by operating the driving unit, thereby scanning a light reflected by the light reflector. The driving unit of the light scanner is the same as the driving unit 4 of the optical device 1. Thus, the angle of rotation movement of the optical scanner can be enlarged, so that a distance between the light reflector and an object to be scanned can be made smaller. As a result, miniaturization of the optical scanner according to this invention can be achieved.

The optical scanner as described above can be preferably applied to an image forming apparatus such as a laser printer, an imaging display, a bar-code reader, or a confocal scanning microscope. The image forming apparatus according to the invention has an optical scanner according to this invention, thereby achieving miniaturization while exhibiting a superior drawing property.

The magnetic body 41 explained in this embodiment is magnetized in an upward direction on the basis of FIG. 2, but the magnetic body 41 magnetized in a downward direction on the basis of FIG. 2 may be used as long as a magnetization direction is perpendicular to the surface of the mass section 21.

Furthermore, the magnetic body 41 explained in this embodiment is provided to the surface of the mass section 21 opposite to the surface provided with the light reflector 6, but a place provided with the magnetic body 41 is not limited to this surface as long as the magnetic body 41 is magnetized in a direction perpendicular to the surface of the mass section 21. Thus, the magnetic body 41 may be provided to, for example, the surface of the mass section 21 provided with the light reflector 6 or each of the surfaces of the mass section 21.

The magnetic body 41 explained in this embodiment is shaped in a thin film form but a form of the magnetic body 41 is not limited to this as long as the magnetic body 41 is magnetized in a direction perpendicular to the surface of the mass section 21. Thus, the magnetic body 41 may be shaped, for example, in a plate form or a rod form.

The yokes 51, 52 explained in this embodiment is in a letter U shape but a shape of the yokes 51, 52 is not limited to this as long as the yokes 51, 52 are provided in a manner to face each other with the mass section 21 intervened. Thus, the yokes 51, 52 may be in a different shape. Furthermore, the yokes 51, 52 may be shaped differently from each other.

The voltage applicator 55 is exemplified as the alternating current source but is not limited to this as long as the voltage is applied to the coil 53. For example, a direct current source may be used. In this case, the mass section 21 can be pivotally moved with respect to the supporting sections 24 by applying the direct current voltage intermittently.

The pair of magnetic poles 511, 521 explained in this embodiment has a distance therebetween in which a region at a side of light incidence gradually widens in a direction of light output. The distance between the magnetic poles 511, 521, however, does not have to include this region.

The yokes 51, 52 and the magnetic core 54 are structured separately but may be structured in a united manner.

Second Embodiment

A second embodiment will be explained next.

Figure 4:
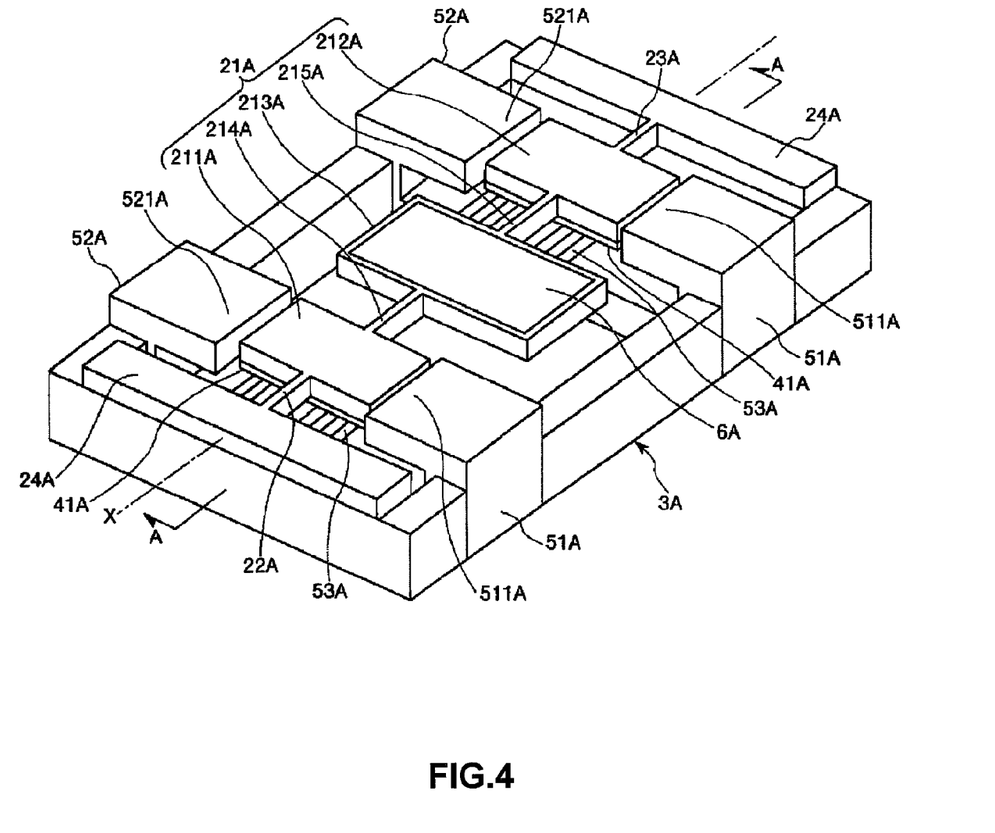
FIG. 4 is a partially-enlarged view of an optical device according to a second embodiment of this invention.
Figure 5:
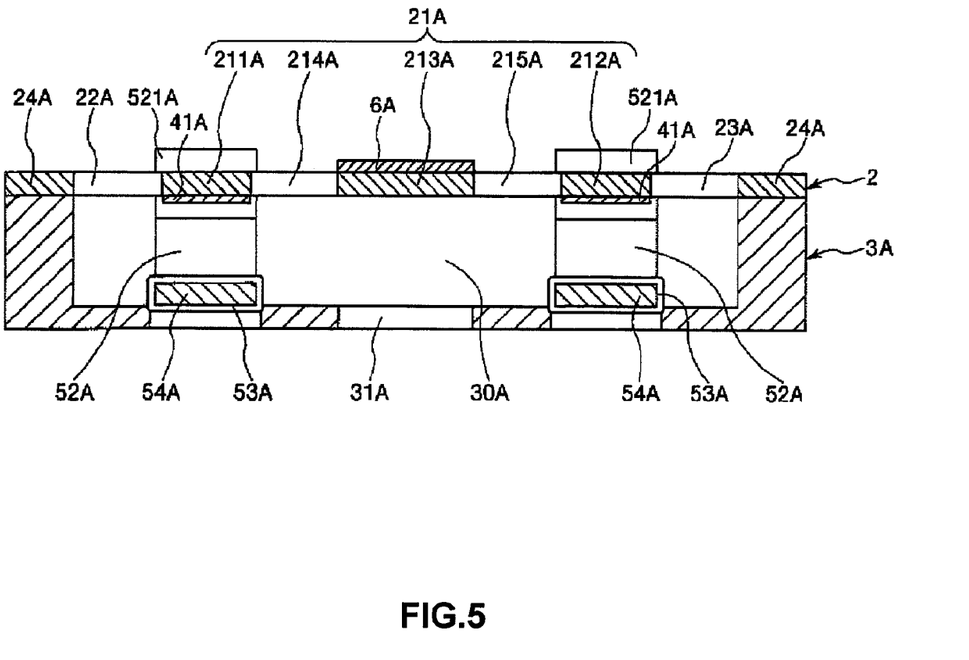
FIG. 5 is a cross-sectional view of FIG. 4 along the line A-A.
Figure 6:
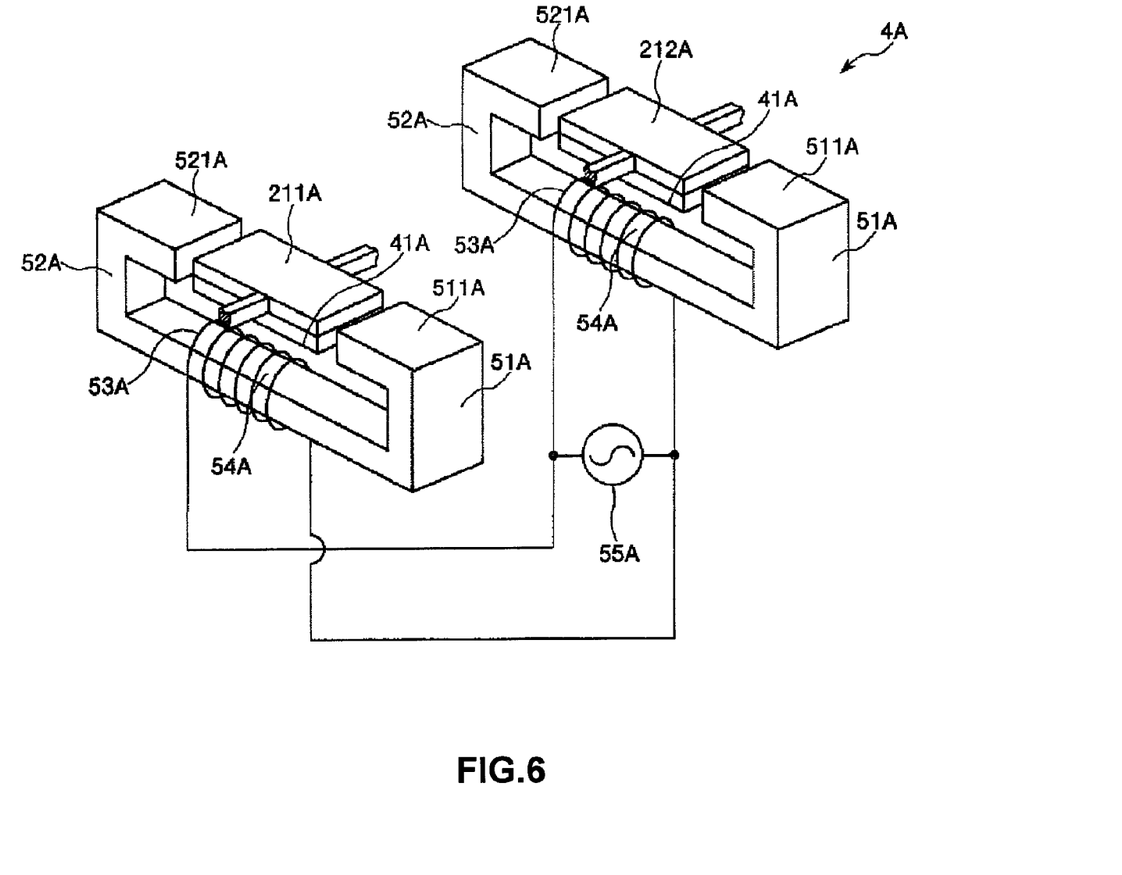
FIG. 6 is a view for illustrating a driving unit.

FIG. 4 is a partially-enlarged view of an optical device according to the second embodiment of this invention. FIG. 5 is a cross-sectional view of FIG. 4 along the line A-A. FIG. 6 is a view for illustrating a driving unit.

For convenience of explanation, hereinafter, a frontward side of a sheet of FIG. 4 is referred to as an "upper" or "upward" side; a downward side is referred to as a "lower" or "downward" side; a right side is referred to as a "right" side; and a left side is referred to as a "left" side.

Hereinafter, an optical device 1A according to the second embodiment is explained mainly in terms of different points between the optical device 1A and the optical device 1 according to the first embodiment, and explanation for the common matters is omitted.

The optical device 1A according to the second embodiment is substantially the same as the optical device 1 according to the first embodiment except a structure of the mass section 21.

In the optical device 1A, the mass section 21A is composed of a pair of first mass sections 211A, 212A, a second mass section 213A, and a pair of coupling sections 214A, 215A, as shown in FIG. 4.

In the optical device 1A described above, a pair of elastic sections 22A, 23A is torsionally deformed by generation of the magnetic field between a pair of magnetic poles 511A, 521A described later, so that the pair of first mass sections 211A, 212A are pivotally moved. In association with this deformation and pivotal movement, the pair of coupling sections 214A, 215A is torsionally deformed to move pivotally the second mass section 213A. At this time, the pair of first mass sections 211A, 212A and the second mass section 213A are each pivotally moved around the pivotal movement central axis X shown in FIG. 4 as a center.

The second mass section 213A is provided between the pair of first mass sections 211A, 212A, in which the pair of first mass sections 211A, 212A is provided so as to be substantially symmetric with respect to the second mass section 213A on the basis of a top view of the second mass section 213A. In a similar manner, the pair of coupling sections 214A, 215A is provided so as to be substantially symmetric with respect to the second mass section 213A on the basis of the top view, and the pair of elastic sections 22A, 23A is provided so as to be substantially symmetric with respect to the second mass section 213A on the basis of the top view. In other words, the optical device 1A according to this embodiment is formed in a manner to be substantially symmetric with respect to the second mass section 213A on the basis of the top view. Furthermore, the optical device 1A is formed in a manner to be symmetric with respect to the pivotal movement central axis X on the basis of the top view.

The second mass section 213A is shaped in a plate form and provided with a light reflector 6A on an upper surface, i.e., a planar surface at a side opposite to a supporting substrate 3A. Thus, the optical device 1 can be applied to an optical device such as an optical scanner, an optical attenuator, or a light switch, for example.

The first mass sections 211A, 212A are formed in a plate shape and have substantially the same shape and size. Furthermore, the first mass section 211A is provided with a magnetic body 41A on a lower surface, i.e., a surface at a side facing the supporting substrate 3A.

With respect to the second mass section 213A and the first mass section 211A, the first mass section 211A is connected to a supporting section 24A via the elastic section 22A while the second mass section 213A is connected to the first mass section 211A via the coupling section 214A.

In a similar manner, with respect to the second mass section 213A and the first mass section 212A, the first mass section 212A is connected to a supporting section 24 via the elastic section 23A while the second mass section 213A is connected to the first mass section 212A via the coupling section 215A.

The elastic section 22A couples the first mass section 211A to one of the supporting sections 24A so that the first mass section 211A is pivotally movable with respect to the supporting section 24. In a similar manner, the elastic section 23A couples the first mass section 212A to the other supporting section 24A so that the first mass section 212A is pivotally movable with respect to the supporting section 24A.

The coupling section 214A couples the second mass section 213 to the first mass section 211A so that the second mass section 213A is pivotally removable with respect to the first mass section 211A. In a similar manner, the coupling section 215A couples the second mass section 213A to the first mass section 212A so that the second mass section 213A is pivotally movable with respect to the first mass section 211A. It is to be noted that each of the coupling sections 214A, 215A is a rod shaped member that is elastically deformable.

The pair of elastic sections 22A, 23A and the pair of coupling sections 214A, 215A described above are provided in a manner to be placed on the same shaft, and the pair of first mass sections 211A, 212A is pivotally movable with respect to the supporting sections 24A with these elastic sections 22A, 23A and the coupling sections 214A, 215A set as the pivotal movement central axis X serving as a rotational axis.

As described above, a base 2A includes a first vibration system composed of the pair of first mass sections 211A, 212A and the pair of elastic sections 22A, 23A, and a second vibration system composed of the second mass section 213A and the pair of coupling sections 214A, 215A. That is, the base 2A includes a two-degree-of-freedom vibration system composed of the first and second vibration systems.

The base 2A is made of silicon as a main material and is provided with the second mass section 213A, the first mass sections 211A, 212A, the elastic sections 22A, 23A, the coupling sections 214A, 215A, and the supporting section 24A in a united manner. As described above, use of the silicon as a main material enables the optical device 1A to achieve superior pivotal movement characteristics and to exhibit superior durability. Furthermore, the use of the silicones enables fine processing while achieving miniaturization of the optical device 1A.

The base 2A may be formed by forming the second mass section 213A, the first mass sections 211A, 212A, the elastic sections 22A, 23A, the coupling sections 214A, 215A, and the supporting section 24 from a substrate having laminated structure, such as an SOI substrate. In this point, it is preferable that the second mass section 213A, the first mass sections 211A, 212A, the elastic sections 22A, 23A, the coupling sections 214A, 215A, and the supporting section 24 be composed in a single layer of the laminated-structural substrate so that these sections are partially united.

Next, a relation between the first mass sections 211A, 212A, and the second mass section 213A will be explained in detail.

A condition is set such that $L_1$ is set as a length of the first mass section 211A in a direction substantially perpendicular to the pivotal movement central axis X, i.e., in a longitudinal direction; $L_2$ is set as a length of the first mass section 212A in a direction substantially perpendicular to the pivotal movement central axis X, i.e., in a longitudinal direction; and $L_3$ is set as a length of the second mass section 213A in a direction substantially perpendicular to the pivotal movement central axis X, i.e., in a longitudinal direction. On this condition, the first mass sections 211A, 212A do not interfere with the second mass section 213A regardless of a size of the second mass section 213A, i.e., the length $L_3$, since the first mass sections 211A, 212A are provided independently in this embodiment. Thus, the lengths $L_1$, $L_2$ can be made small. Therefore, a rotation angle, i.e., a swing angle of each of the first mass sections 211A, 212A can be enlarged, thereby enabling a rotation angle of the second mass section 213A to be enlarged.

Furthermore, it is preferable that a size of each of the first mass sections 211A, 212A and the second mass section 213A be set to satisfy a relation of $L_1<L_3$ as well as $L_2<L_3$.

By satisfying the above relation, $L_1$ and $L_2$ can be made smaller; a rotation angle of each of the first mass sections 211A, 212A can be made larger; and a rotation angle of the second mass section 213A can be made larger.

In this case, it is preferable that the maximum rotation angle of the second mass section 213A be set greater than or equal to 20 degrees.

The structure described above enables a lower-voltage driving of the first mass sections 211A, 212A and vibration, i.e., pivotal movement of the second mass section 213A at a large rotation angle.

Therefore, in the case of applying the optical device 1A described above to an optical scanner used for a projector, a laser printer, or a confocal scanning microscope, the device can be miniaturized easily.

As described above, $L_1$ $L_2$ are set substantially equal to each other in this embodiment but may be different.

With respect to the base 2A described above in detail, a supporting substrate 3A is bonded thereto.

The supporting substrate 3A is made of a nonmagnetic body such as glass or silicon as a main material.

The supporting substrate 3A is provided with a concave section 30A on an upper surface, as shown in FIG. 5.

An opening 31A is formed in a portion of a bottom surface of the concave section 30A, which is corresponding to the second mass section 213A. This opening 31A functions as a runout section for preventing the second mass section 213A from coming into contact with the supporting substrate 3A at the time of pivotal movement. Formation of the opening 31A as the runout section prevents entire upsizing of the optical device 1A while setting a swing angle, i.e., amplitude of the second mass section 213A larger.

The runout section described above does not necessarily have to be open in a lower surface of the supporting substrate 3A, i.e., a surface at a side opposite to the second mass section 213A as long as a structure to produce the effects described above is furnished. In other words, the runout section may be composed of a concave section provided to an upper surface of the supporting substrate 3A. In the case where a concave section 30A is deep in comparison to a swing degree, i.e., amplitude of the second mass section 213A, formation of the opening 31A is not necessary.

A driving unit 4A for pivotally moving the mass section 21A will be explained next.

The driving unit 4A includes a magnetic body 41A as a magnetic section provided to the first mass section 211A, a magnetic body 41A as a magnetic section provided to the first section 212A, and a magnetic field generator 5A for generating the magnetic field exerted on the pair of magnetic bodies 41A, 41A.

The driving unit 4A will be explained in detail hereinafter. However, a structure of the unit for driving the first mass section 211A and a structure of the unit for driving the first mass section 212A are the same, so that the structure for driving the first mass section 211A is explained on behalf of these two structures and explanation for the structure for driving the first mass section 212A is omitted.

The first mass section 211A is provided with the magnetic body 41A on a lower surface, i.e., a surface at a side opposite to the light reflector 6.

The magnetic body 41A as described above is provided so as to be substantially symmetric with respect to the pivotal movement central axis X. Thus, shift of the pivotal movement central axis X of the first mass section 211A can be prevented even where the first mass section 211A is provided with the magnetic body 41A. As a result, the optical device 1A enables stable pivotal movement of the first mass section 211A, followed by stable pivotal movement of the second mass section 213A.

Furthermore, the magnetic body 41A is shaped in a thin film form and is formed along a surface of the first mass section 211A. Therefore, the first mass section 211A can be reduced in total thickness, i.e., a length of a direction perpendicular to the surface, thereby achieving miniaturization of the optical device 1A. Yet further, a distance between centers of the first mass section 211A and the magnetic body 41A in a direction perpendicular to the surface of the first mass section 211A can be shortened, thereby enabling stable pivotal movement of the first mass section 211A.

The magnetic body 41A described above is magnetized, that is, made magnetic, in a direction perpendicular to the surface of the first mass section 211A.

The magnetic field generator 5A includes, to pivotally move the first mass section 211A, a pair of yokes 51A, 52A, a coil 53A for generating a magnetic field, a magnetic core 54A on which the coil 53A is wound, and an alternating current source 55A for applying voltage to the coil 53A.

Furthermore, the magnetic field generator 5A includes, to pivotally move the first mass section 212A, a pair of yokes 51A 52A, a coil 53A for generating a magnetic field, a magnetic core 54A on which the coil 53A is wound, and an alternating current source 55A as a voltage applicator for applying voltage to the coil 53A.

The magnetic core 54A is provided securely to the supporting substrate 3A, as shown in FIG. 5. The coil 53A is wound on this magnetic core 54A and is connected to the alternating current source 55A.

One end of the yoke 51A is connected to the magnetic core 54A and the other end faces a side surface of the first mass section 211A. An end portion of the yoke 51A, which is located at a side facing the first mass section 211A, functions as a magnetic pole 511A. In this embodiment, the yoke 52A is in a letter U shape.

In a similar manner, one end of the yoke 52A is connected to the magnetic core 54A and the other end faces a side surface of the first mass section 211A. An end portion of the yoke 52A, which is located at a side facing the first mass section 211A, functions as a magnetic pole 521A. In this embodiment, the yoke 52A is in a letter U shape is made approximately the same as the yoke 51A in shape and size.

In other words, the yokes 51A, 52A form the magnetic path in a manner to compose a pair of the magnetic poles 511A 521A.

The magnetic field generator 5A described above is formed such that the magnetic poles 511A, 521A are made to exhibit polarities different from each other by applying the voltage from the alternating current source 55A to the coil 53A so as to generate a magnetic field between the pair of magnetic poles 511A, 521A. As a result, the magnetic generator 5A can generate the magnetic field between the magnetic poles 511A, 521A with a comparatively simple structure.

The pair of magnetic poles 511A, 521A is provided so as to be face each other with the first mass section 211A intervened therebetween in a direction perpendicular to the pivotal movement central axis X on the basis of a top view of the mass section 21A in a non-driven condition. With the structure described above, the pair of magnetic poles 511A, 521A can be placed near the mass section 21A, thereby achieving miniaturization of the optical device 1A and power saving. With the structure described above, furthermore, the pair of magnetic poles 511A, 521A can be prevented from disturbing pivotal movement of the first mass section 211A, thereby enlarging the angle of pivotal movement of the first mass section 211A. In other words, this structure achieves miniaturization of the optical device 1A and power saving while enlarging the angle of pivotal movement of the second mass section 213A

The pair of magnetic poles 511A, 521A is provided so as to be slightly longer than or be substantially equal to the magnetic body 41A in a direction parallel to the pivotal movement central axis X of the mass section 21A. Therefore, the magnetic body 41A receives magnetic force uniformly in a direction parallel to the pivotal movement central axis X, thereby enabling the first mass section 211A to pivotally move with stability, and further, achieves power saving.

As shown in FIG. 4, the magnetic poles 511A, 512A are provided in a manner to face side surfaces of the first mass section 211A which are distal to the pivotal movement central axis X. Thus, the magnetic field can be reliably generated between the pair of the magnetic poles 511A, 521A.

The structure of the driving unit 4A for pivotally moving the first mass section 211A was explained above. A similar structure is adopted to pivotally move the first mass section 211A.

As shown in FIG. 6, the alternating current source 55A is structured in a manner to apply the voltage to each of the pair of coils 53A, 53A. Thus, the first mass sections 211A, 212A can be pivotally moved in synchronization with each other. As a result, the second mass section 213A can be pivotally moved with more stability.

The magnetic body 41A described in this embodiment is provided to the lower surface of the first mass section 211A, but a place provided with the magnetic body 41A is not limited to this surface as long as the magnetic body 41A is magnetized in a direction perpendicular to the surface of the first mass section 211A. The magnetic body 41A may be provided to, for example, the upper surface. Furthermore, the first mass sections 211A, 212A may be provided with the magnetic body 41 in a different place.

The yokes 51A, 52A explained in this embodiment is a letter U shape but a shape of the yokes 51A, 52A is not limited to this as long as the magnetic poles 511A, 521A are provided in a manner to face each other with the first mass sections 211A, 212A intervened. Furthermore, the yokes 51A, 52A are not necessarily the same in shape.

The alternating current source 55A as the voltage applicator described in this embodiment applies the alternating-current voltage to each of the pair of coils 53A, 53A. However, two alternating current sources may be used in which one alternating current source applies the voltage to one of the coils 53A while the other alternating current source applies the voltage to the other coil 53A.

In this embodiment, the magnetic field generator 5A includes two sets of the pair of yokes 51A, 52A, the coil 53A, and the core 54A but is not limited thereto. For example, the pair of yokes may be used that has a length substantially equal to a length of the mass section 21A in a direction parallel to the pivotal movement central axis X.

The second embodiment described above can produce the effect similar to that of the first embodiment.

The optical device, the optical scanner, and the image forming apparatus according to this invention were explained above according to the embodiments illustrated in the drawings, but this invention is not limited to these. In the optical device according to this invention, for example, a structure of each element can be replaced with an arbitrary structure that fulfills similar functions and can be added with an arbitrary structure.

According to the embodiments described above, a structure is such that a shape is substantially symmetric with respect to a surface that extends along a center of the optical scanner and is perpendicular to a pivotal movement axis line of the mass section or the driving section, but the shape may be dissymmetric.

According to the embodiments described above, a structure is such that the light reflector is provided to the upper surface of the mass section, i.e., the surface at the side opposite to the supporting substrate while a thermal radiating section is provided to a rear surface of the mass section, the surface at the side of the supporting substrate. However, such a structure may be acceptable that these light reflector and thermal radiating section are provided inversely.

What is claimed is:

1. An optical device comprising:
a mass section in a plate shape including a light reflector with light reflectivity, the mass section including:
a pair of first mass sections in a plate form;
a second mass section provided between the pair of first mass sections on the basis of a top view; and
a pair of coupling members with elastic deformability for coupling the second mass section to the first mass sections in a pivotally movable manner;
wherein the second mass section is provided with a light reflector and each of the first mass sections is provided with a magnetic section;
a supporting section for supporting the mass section;
a pair of elastic sections with elastic deformability for coupling the mass section to the supporting section in a pivotally movable manner; and
a driving unit for pivotally moving the mass section, the driving unit including:
a magnetic section provided on the mass section, magnetized in a direction perpendicular to a surface of the mass section;
a pair of magnetic poles with different polarities, provided in a manner to face each other in a direction perpendicular to a pivotal movement central axis with the magnetic portion intervened on the basis of a top view of the mass section in a non-driven condition, wherein the pair of magnetic poles are formed in a single yoke, with one magnetic pole being on one end of the yoke and the other magnetic pole with the different polarity is disposed on the other end of the yoke, with a magnetic path being formed in the yoke therebetween by a magnetic core disposed between the two ends of the yoke on which a coil is wound; and
a magnetic field generator having a coil for generating a magnetic force between the pair of magnetic poles which is disposed in the magnetic path of the yoke by applying a current to the coil wound around the magnetic core, wherein the mass section is pivotally moved upon torsional deformation of the elastic section by operating the driving unit so that a direction of light reflected by the light reflector is changeable, and wherein the magnetic generator is structured in a manner to generate a magnetic field between the pair of magnetic poles by applying a voltage to the coil to pivotally move the mass section with respect to the supporting section.

2. The optical device according to claim 1, wherein the light reflector of the second mass section is provided on a surface of the second mass section which faces opposite to the surface of the first mass sections where the magnetic section is provided.

3. The optical device according to claim 2, wherein the magnetic section is shaped in a thin film form and is provided along the surface of the mass section.

4. The optical device according to claim 3, wherein the magnetic field generator includes:

a magnetic core on which the coil is wound;
a pair of yokes provided to both end portions of the magnetic core, forming a magnetic path in a manner to compose the pair of magnetic poles; and
a voltage applicator for applying a voltage to the coil, wherein:
the voltage applicator applies the voltage to the coil so as to generate the magnetic field between the pair of magnetic poles.

5. The optical device according to claim 4, wherein the voltage applicator is structured in a manner to apply an alternating voltage to the coil.

6. The optical device according to claim 4, wherein each of the magnetic poles has a length substantially equal to a length of the magnetic section in a direction parallel to the pivotal movement central axis of the mass section.

* * * * *